UNITED STATES PATENT OFFICE.

BENJAMIN BEST, OF DAYTON, OHIO.

COMPOSITION TO PREVENT THE PREMATURE DECAY OF TREES, VINES, &c.

Specification forming part of Letters Patent No. 31,587, dated March 5, 1861.

*To all whom it may concern:*

Be it known that I, BENJAMIN BEST, of Dayton, in the county of Montgomery, in the State of Ohio, have invented and discovered a new and improved mode and composition of matter to preserve and prevent the premature decay of trees, vines, and other growing vegetation, to be denominated "Best's Tree-Invigorator;" and I do hereby declare that the following is a full and exact description thereof.

The nature of my invention and discovery consists in making and compounding the following materials into the mixture following and in the following proportions, to wit: I take one gallon of sperm or whale oil, a half-gallon of tar, one pound of saleratus, and one pound of ammonia. I mix said materials well together, and put them into a barrel or other vessel capable of holding from thirty-six to forty gallons, and fill up the same with rain-water, stirring and mixing the whole thoroughly together. I then take cotton, wool, old clothes, or other soft material capable of being thoroughly saturated with said mixture, and, after soaking them in the same, bind a sufficient quantity round the tree to cover several inches of the surface of the tree near the ground, and every other morning for the space of ten days, early, before the sun gives much heat, wet the same with the above compound. This should be done in the spring, when the frost has left the earth and the trees commence budding. Vines, raspberries, currants, and other like vegetation need only to be bathed about the lower part of the stalk, near the roots, with a watering-pot or other convenient vessel.

The quantity of the mixture may be increased or diminished as occasion requires by observing the proportions above given.

What I claim as my invention and discovery, and desire to secure by Letters Patent, is—

The compound mixture of the above materials and its application and use to and for trees, vines, and other growing vegetation.

BENJAMIN BEST.

Witnesses:
 DAVID A. HOUK,
 E. S. YOUNG.